United States Patent

[11] 3,556,258

| [72] | Inventors | John L. Winge;<br>Donald W. Howard, South Bend, Ind. |
|---|---|---|
| [21] | Appl. No. | 773,825 |
| [22] | Filed | Nov. 6, 1968 |
| [45] | Patented | Jan. 19, 1971 |
| [73] | Assignee | The Bendix Corporation<br>a corporation of Delaware |

[54] BRAKE LINING WEAR INDICATOR
14 Claims, 6 Drawing Figs.

[52] U.S. Cl. ................................................. 188/1,
116/114
[51] Int. Cl. ..................................................... F16d 66/02
[50] Field of Search ........................................... 188/1A;
116/67, 114(.16)

[56] References Cited
UNITED STATES PATENTS

| 2,146,357 | 2/1939 | Schweikle | 188/1(A)X |
| 3,088,549 | 5/1963 | Borsa | 188/1(A) |

*Primary Examiner*—Duane A. Reger
*Attorneys*—C. F. Arens and Plante, Arens, Hartz and O'Brien ABSTRACT: This invention relates to a device providing a warning signal to the vehicle operator when the brake lining has worn a predetermined amount, and more specifically, concerns an electronic control means which is responsive to a probe means inserted in the brake lining for controlling an indicator means that provides a visual indication.

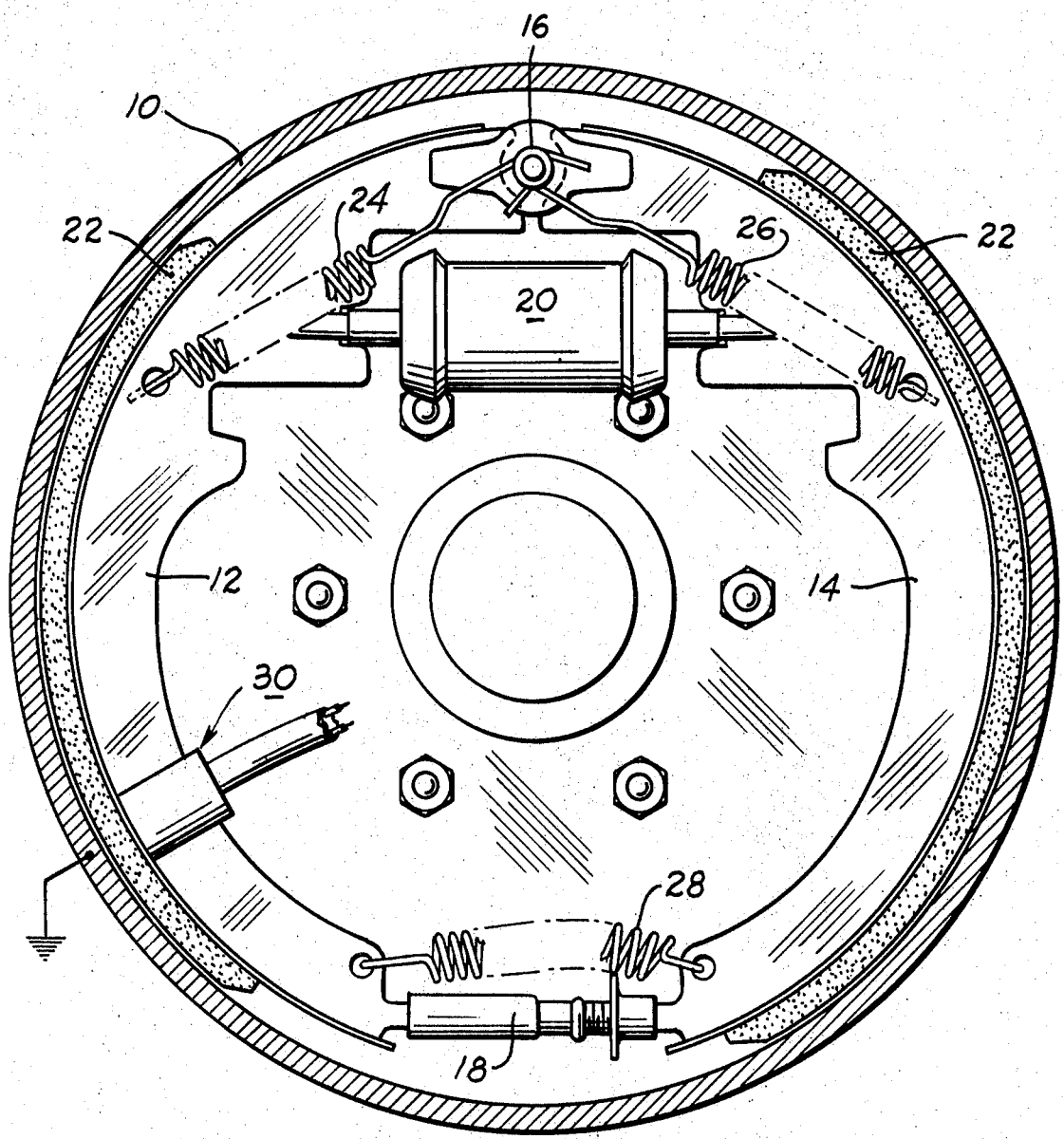
FIG_1

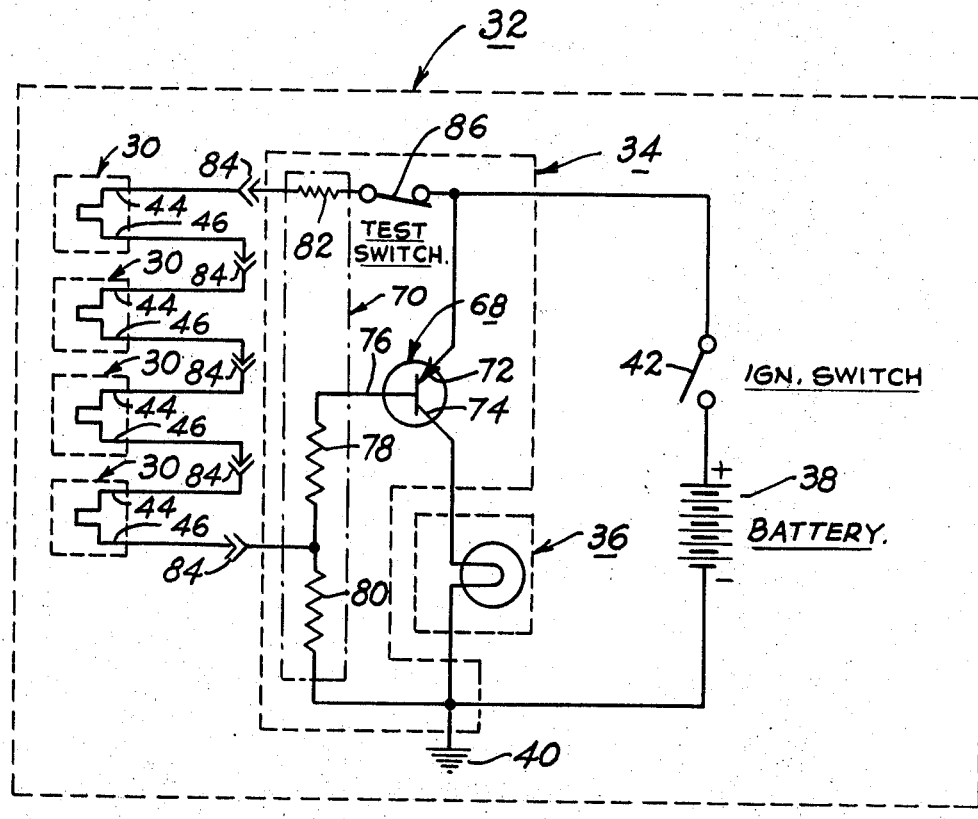
FIG_2
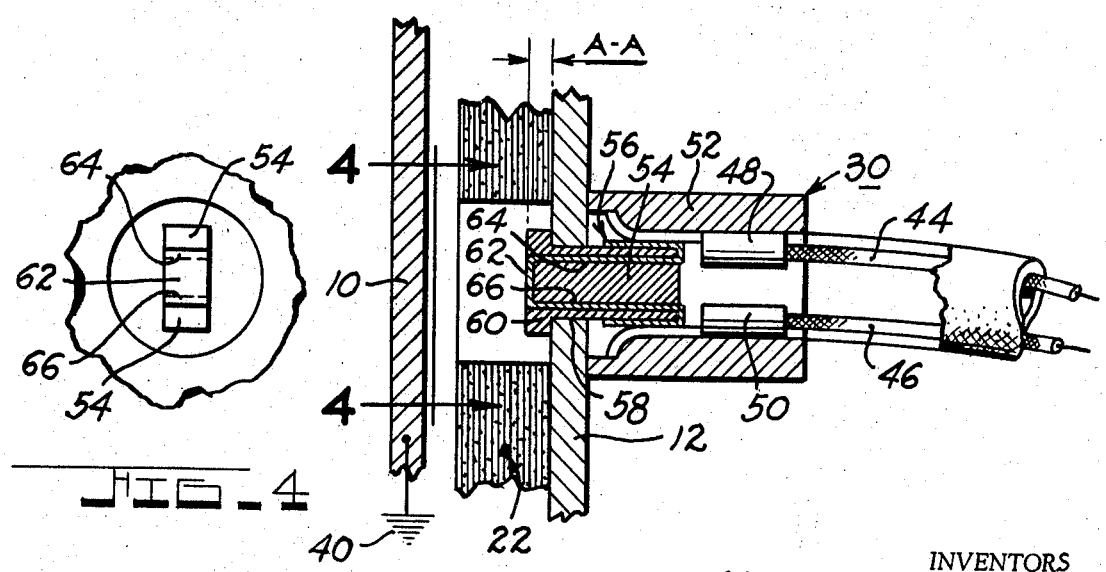
FIG_4
FIG_3
INVENTORS
JOHN L. WINGE
DONALD W. HOWARD

INVENTORS
**JOHN L. WINGE
DONALD W. HOWARD**

BRAKE LINING WEAR INDICATOR

BACKGROUND OF THE INVENTION

At the present time, the inspection of the condition of brake linings requires that the brake structure be disassembled in order to make the examination directly, and in the case of automobiles this requires the relatively laborious process of jacking up the car and removing the wheels, and then reversing these steps after the inspection is complete. While this procedure is merely inconvenient in the case where the brake linings are in a private or pleasure automobile, in commercial vehicles, such as trucks, taxi cabs, buses, off-the-road vehicles and the like, where there is a necessity for a continuous inspection or preventive maintenance program, this process is laborious, time consuming, inefficient and costly.

Many devices have been developed in the past to provide some type of signal to a vehicle operator to inform him that brake lining wear has progressed a predetermined amount. However, these devices have generally been sophisticated, bulky and very expensive to manufacture and install in vehicles. Moreover, the operational reliability of these devices has been entirely unsatisfactory, and thus, their anticipated widespread use has never materialized.

SUMMARY OF THE INVENTION

It is an object of this invention to provide a brake lining wear indicator that does not require the brake structure to be disassembled to determine if the linings are worn to the point that they need replacing.

It is an object of this invention to provide instantaneous indication when the brake linings reach a point of wear which requires replacement.

It is an object of this invention to provide a brake lining wear indicator that does not interfere with normal operation of the brake.

It is an object of this invention to provide a brake lining wear indicator that is compact, easy to manufacture and install, and reasonably priced.

It is an object of this invention to provide a brake lining wear indicator that has operational reliability of a level heretofore unattainable.

It is an object of this invention to provide a brake lining wear indicator that incorporates a self-test feature to warn the vehicle of a failure internal to said indicator system.

It is an object of this invention to provide a brake lining wear indicator that recognizes a failure in the interconnections between the probe means and the control ma means and warns the vehicle operator thereof.

Other objects and features of the invention will be apparent from the following description of the brake lining wear indicator taken in connection with the accompanying drawings.

BRIEF DESCRIPTION OF THE DRAWINGS

FIG. 1 is an elevation view of a brake assembly showing the general probe means location of the present invention;

FIG. 2 is a schematic presentation of one form of the invention;

FIG. 3 is an enlarged sectional view of the probe means used in association with the circuit shown in FIG. 2;

FIG. 4 is a sectional view taken along line 4—4 of FIG. 3;

A DESCRIPTION OF THE PREFERRED EMBODIMENT

Figure 5:
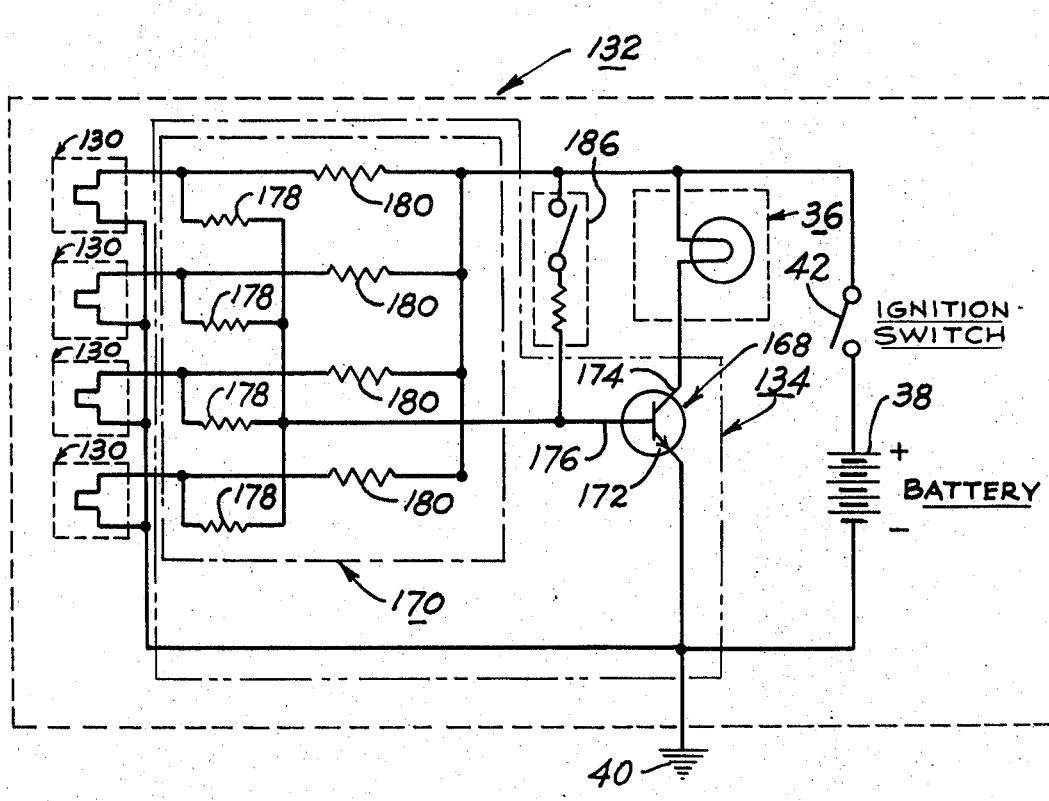
FIG. 5 is a schematic presentation of another form of the invention.

Referring now to FIG. 1, the brake assembly includes a brake drum 10 and conventional brake shoes 12 and 14 engaging an anchor pin 16 at their upper ends. A conventional lining wear adjustment mechanism 18 connects the lower ends of the shoes 12 and 14 and a wheel cylinder 20 is provided to actuate the shoes into engagement with the drum 10 when it is desired to retard the movement of a vehicle. The shoes 12 and 14 have linings 22 secured thereto and are biased to a retracted position by springs 24 and 26 while a spring 28 is provided to maintain the lower ends of shoes 12 and 14 into engagement with adjustment mechanism 18.

A probe means 30 is suitably installed in one or both of the brake shoes to provide an indication when the linings 22 have worn to the point where they need replacing.

Referring now to FIG. 2, the brake lining wear indicator 32 is comprised of one or more probe means 30, a transistorized control means 34, and an indicator means 36, with the transistorized control means 34 in series with the indicator means 36 being interposed between the vehicle battery or source of voltage 38 and an electrical ground 40. Of course, a conventional ignition switch 42 is provided to disconnect the battery 38 from the transistorized control means 34 during inoperable periods.

Referring now to FIG. 3, the probe means 30 includes wires 44 and 46 which have attached thereto, respectively, terminals 48 and 50. A retainer means 52 is provided to carry said terminals 48 and 50 in an opposing relationship. A nonconductive plug 54 has suitably embodied therein a generally U-shaped conductor member 56. Said plug 54 is then suitably installed in an opening 58 in the brake shoe 12, and further has a flange 60 for abutment against said brake shoe 12. The conductor member 56 has a flat portion 62, exposed from said conductor plug 54 for engagement with said brake drum 10, and legs 64 and 66 for contacting said terminals 48 and 50, respectively. The plug 54 and conductor member 56 frictionally cooperate with said terminals 48 and 50 and said retainer means 52 to firmly secure flat portion 62 of conductor 56 with respect to said brake shoe 12, and thus establish a predetermined relationship between said flat portion and said lining 22 of the brake shoe 12. As shown best in FIG. 3, the predetermined relationship between the brake shoe 12 and flat portion 62 is identified as distance A–A. The distance A–A represents the point of wear at which the lining 22 should be replaced.

Referring back now to FIG. 2, the transistorized control means 34 includes a transistor 68 having input and output elements and a bias means 70. The output element of the transistor 68 includes an emitter 72 which is connected to the source of voltage 38 through the ignition switch 42 and collector 74 which is connected in series with the indicator means or light bulb 36, which in turn, is connected to the electrical ground 40. The input element or base 76 of the transistor 68 is connected to the bias means 70 to maintain the transistor 68 in a normally nonconducting state. Bias means 70 is comprised of resistors 78, 80 and 82. Base lead 76 is connected in a series flow relationship through resistors 78 and 80 to electrical ground 40. The junction of resistors 78 and 80 is connected through one or more probe means 30 and connectors 84 to resistor 82 whose other end is connected to the source of voltage 38 through the ignition switch 42. Since the bias means 70 is preselected to maintain the transistor 68 in a normally nonconducting state, the light bulb 36 will not glow as long as sufficient lining material 22 is available to prevent frictional contact between the member 62 and the drum 10. However, when the brake lining material 22 is worn to the point that upon a braking application, flat portion 62 of the conductor member 56 engages the brake drum 10, the base 76 of the transistor 68 will be grounded through the resistor 78, the probe means 30 and the brake drum 10 to electrical ground 40, since the brake drum 10 is normally at electrical ground 40. Upon grounding of base 76 the transistor 68 will be switched to a conducting state thus applying voltage across and current through the light bulb 36, causing it to glow. Thus, each time thereafter that the operator of the vehicle applies the brakes said flat portion 62 of the probe means 30 will be grounded electrically causing the indicator means 36 to glow and thus advising the operator of the vehicle that his brake linings are worn to the point where they need replacement.

As may readily be seen from the drawings, the concept disclosed herein can equally well be applied to disc brakes as well as other forms of brakes not shown.

Although the preferred embodiment shown in FIG. 2, four probe means 30, each for use with one of the four wheels of an automobile, a small smaller or larger quantity could be installed in the vehicle within the scope of the present invention.

MODE OF OPERATION OF THE PREFERRED EMBODIMENT

When the operator of the vehicle turns the starter switch (not shown) to start the engine, the source of voltage 38 will be imposed across the transistor 68 and light bulb 36 through the ignition switch 42. Simultaneously, test means or switch 86 will be opened, and thus base 76 of the transistor 68 will be connected through the resistor 78 and 80 to electrical ground. This momentary condition will effectively ground base 76, causing transistor 68 to conduct current to the light bulb 36 causing it to glow. Thus, the operator of the vehicle will know that the transistorized control means 34 and indicator means 36 have not experienced component or interconnection failures during prior use. Upon release of the starter switch to its normal operating position, test means or switch 86 will close, thereby applying voltage through the plurality of prove means and bias means 70 to base lead 76 of the transistor, which switches transistor 68 to its normally nonconducting state, and thus deenergizes light bulb 36.

After substantial wear has been experienced by the brake lining 22, the flat portion 62 of the probe means 30 will engage the brake drum 10 upon a subsequent brake application. As may be seen best in FIGS. 3 and 4, upon engagement of the flat portion 62 with the brake drum 10, an electrical ground is presented to base 76 through the resistor 78, thus switching transistor 68 to a conducting state, which causes light bulb 36 to glow. Upon release of the brake application continuity between the source of voltage through the probe means 30, bias means 70, and the base 76 is reestablished to switch the transistor 68 to a nonconducting state, and thus, turn the light bulb 36 off. However, after a series of subsequent applications the flat portion 62 will be frictionally worn away by its engagement with the rotating brake drum 10, such that, upon release of the brake application, sufficient material will not remain to provide electrical continuity between legs 64 and 66 of said conduction member 56. As may be seen in FIG. 4, the construction and orientation of the probe means 30, and specifically flat portion 62 thereof, is predetermined with respect to the direction of rotation of the brake drum 10 to allow the metal comprising flat portion 62 to be carried away from said probe means 30 as frictional engagement and wear of flat portion 62 is experienced. Thus, by design, when the brake lining material reaches the thickness identified as A-A in FIG. 3, subsequent brake applications are intended to create an electrical discontinuity between legs 64 and 66 of the probe means which will switch the transistor 68 and indicator means 36 to an on condition, thereby indicating to the operator of the vehicle that the brake lining material must be replaced, since the light bulb 36 remains on at all times, rather than merely during a braking application.

It is parenthetically mentioned, that since the brake lining wear indicator is used as somewhat of an alarm or warning device to the operator of the vehicle, the indicator means 36 may employ a red incandescent lamp.

DESCRIPTION OF THE MODIFIED EMBODIMENT

In the embodiment shown in FIG. 5, those parts which are indentical to corresponding parts of the preferred embodiment depicted in FIG. 2 will be given the same identifying numbers.

Referring now to FIG. 5, the brake lining wear indicator 132 is again comprised of one or more probe means 130, a transistorized control means 134, and an indicator means 36, with the transistorized control means 134 in series with the indicator means 36 being interposed between the vehicle battery or source of voltage 38 and an electrical ground 40. A conventional ignition switch 42 is provided to disconnect the battery 38 from the transistorized control means 134 during periods when the vehicle is not in use.

Figure 6:
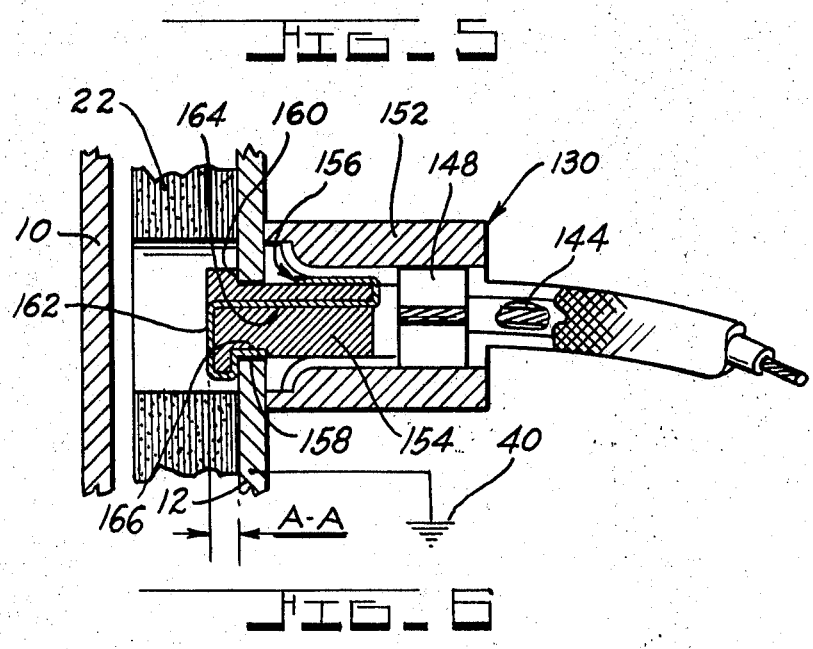
FIG. 6 is a sectional view of the probe means used in association with the circuit shown in FIG. 5.

Referring now to FIG. 6, the probe means 130 includes a wire 144 which is attached to terminal 148. A retainer means 152 is provided to house said terminal 148. A nonconductive plug 154 has suitably embodied therein a generally J-shaped conductor member 156. Said plug 154 is suitably installed in an opening 158 in the brake shoe 12, and further has a flange 160 for abutment against said brake shoe 12. The conductor member 156 has a flat portion 162, exposed from said conductor plug 154 for engagement with the brake drum 10. The conductor member further, has a leg 164 for contracting said terminal 148. The plug 154 and conductor member 156 frictionally cooperate with said terminal 148 and said retainer means 152 to firmly secure flat portion 162 of conductor 156 with respect to said brake shoe 12, and thus establish a predetermined relationship between said flat portion and said lining 22 of the brake shoe 12. As may be seen in FIG. 6, the predetermined relationship between the brake shoe 12 and flat portion 162 is identified as distance A-A. As discussed in detail hereinabove, the distance A-A represents the point of wear at which the lining 22 should be replaced. It is further noted that the conductor member 156 includes a shorter leg 166 which is in frictional contact with the brake shoe 12 to establish electrical continuity therebetween.

Referring back now to FIG. 5, the transistorized control means 134 includes a transistor 168 having input and output elements and a bias means 170. The output element of the transistor 168. includes an emitter 172 which is connected to electrical ground 40 and a collector 174 which is connected in series with the indicator means or light bulb 36, which in turn, is connected to the source of voltage 38. The input element or base 176 of the transistor 168 is connected to the bias means 170 to maintain the transistor 168 in a normally nonconducting state. Bias means 170 is comprised, as shown in the drawing, of four sets of resistors 178 and 180; one set for use in association with each of the probe means 130. It is noted, that should it be desirable to use a larger or smaller number of probe means 130, the bias means 170 would include a corresponding larger or smaller number of resistor sets 178 and 180. Base lead 176 of transistor 168 is connected in a series flow relationship through resistors 178 and 180 to said source of voltage 38. The junction of resistors 178 and 180 is connected to said probe means 130, which in turn is connected to electrical ground. Since the bias means 170 is preselected to maintain the transistor 168 in a normally nonconducting state, the light bulb 36 will not glow as long as sufficient lining material 22 is available for frictional engagement with the brake drum 10. However, when the brake lining material 22 is worn to the point that upon the braking application, flat portion 162 of the conductor member 156 engages the brake drum 10, said flat portion 162 will be frictionally worn away due to the rotation of the brake drum and the electrical continuity between leg 164 and leg 166 of said conductor member 156 will be broken. Thus, upon release of the brake application, a rather large positive voltage will be imposed through said bias means 170 upon the base 176; and switch said transistor 168 to a conducting state, which in turn, causes the light bulb 36 to glow continuously.

MODE OF OPERATION OF THE MODIFIED EMBODIMENT

When the operator of the vehicle turns the ignition or starter switch 42 to start the engine the source of voltage 38 will be imposed across the light bulb 36 and the transistor 168. Simultaneously, test means 186, including a switch and resistor in series, will be closed, and thus base 176 of the transistor 168 will be connected to said source of voltage 38. This momentary condition will cause transistor 168 to conduct current to the light bulb 36 causing it to glow. Thus, the operator of the vehicle will know that the transistorized control means 134 and indicator means 36 have not experienced component or interconnection failures during previous use. Upon release of the starter or ignition switch to its normal operating position test means 186 will open thereby allowing bias means 170 to switch said transistor 168 to its normally nonconducting state, and thus deenergize light bulb 36.

After substantial wear has been experienced by the brake lining 22, the flat portion 162 of the probe means 130 will engage the brake drum 10. Subsequent brake applications will cause the brake drum 10 to frictionally wear away the flat portion 162 so as to disrupt the electrical continuity between legs 164 and 166 of said conductor member 156. Upon release of the braking application the junction of resistors 178 and 180 will be removed from electrical ground, and thus said bias means 170 will switch transistor 168 to its conducting state wherein said light bulb 36 will glow continuously.

Obviously, many modifications and variations of the present invention are possible in light of the above teachings. It is intended to cover all changes and modifications of the embodiments set forth herein which do not constitute departures from the spirit and scope of the invention.

I claim:

1. In a brake:
   a member to be braked;
   a friction member having a lining for engagement with said member to be braked;
   probe means carried by said friction member for engagement with said member to be braked after a predetermined amount of lining wear;
   indicator means;
   a voltage source;
   transistorized control means operatively connected between the voltage source, the probe means, the indicator means, and an electrical ground for actuating said indicator means upon said predetermined amount of lining wear; and
   said transistorized control means including transistor means having an input element and an output element, said output element being in series flow relationship with said indicator means, said voltage source and said ground, and bias means connected to said input element, said input element being responsive to said probe means to switch the transistor means upon engagement of the probe means with the member to be braked.

2. In a brake:
   a member to be braked;
   a friction member having a lining for engagement with said member to be braked;
   probe means carried by said friction member for engagement with said member to be braked after a predetermined amount of lining wear;
   indicator means;
   a voltage source;
   transistorized control means operatively connected between the voltage source, the probe means, the indicator means, and an electrical ground for actuating said indicator means upon said predetermined amount of lining wear; and
   said transistorized control means including a transistor having an input element and an output element, said output element being in series flow relationship with said indicator means, said voltage source, and said ground; and bias means connected to said input element to keep said transistor in a normally nonconducting state, said input element being responsive to said probe means to switch the transistor means to a conducting state upon engagement of the probe means with the member to be braked.

3. A brake lining wear indicator as claimed in claim 2, wherein said bias means comprises:
   a first and second resistor, in series flow relationship, interposed between said input and said ground; and
   a third resistor interposed between said supply and the junction of said first and second resistors.

4. A brake lining wear indicator as claimed in claim 3, wherein said probe means is interposed between said third resistor and said junction of said first and second resistors.

5. A brake lining wear indicator as claimed in claim 4, wherein said probe means, after a predetermined period of frictional engagement with said member to be braked, is separated thereby and provides an open circuit to said junction, which upon disengagement of said probe means and said member to be braked, will cause said transistor to remain in a conducting state.

6. In a brake:
   a member to be braked;
   a friction member having a lining for engagement with said member to be braked;
   probe means carried by said friction member for engagement with said member to be braked after a predetermined amount of lining wear;
   indicator means;
   a voltage source;
   transistorized control means operatively connected between the voltage source, the probe means, the indicator means, and an electrical ground for actuating said indicator means upon said predetermined amount of lining wear; and
   said transistorized control means including transistor means having an input element and an output element, said output element being in series flow relationship with said indicator means, said voltage source, and said ground, and bias means connected to said input element to keep said transistor in a normally nonconducting state, and input element being responsive to said probe means after a predetermined period of frictional engagement of the latter with the member to be braked provides an open circuit to said bias means to switch said transistor to a conducting state.

7. A brake lining wear indicator as claimed in claim 6, wherein said bias means comprises a first and second resistor, in series flow relationship, interposed between said input and said source of voltage.

8. A brake lining wear indicator as claimed in claim 7, wherein said probe means is connected to the junction intermediate said first and second resistors.

9. A brake lining wear indicator as claimed in claim 1, and further including a test means interposed between said source of voltage and said bias means to check the integrity of said transistorized control means and said indicator means.

10. A brake lining wear indicator as claimed in claim 6, and further including a test means interposed between said source of voltage and said input element to check the integrity of said transistorized control means and said indicator means.

11. A probe carried in the friction lining of a brake shoe for engagement with a member to be braked upon a predetermined amount of lining wear to actuate a warning device, said probe comprising:
   first and second wires;
   first and second terminals secured, respectively, to said first and second wires;
   retainer means in which said first and second terminals are carried in an opposing relationship;
   a generally U-shaped conductor member being embodied in a nonconducting plug;
   said plug installed in a an opening in said friction member and having a flange for abutment against said friction member;
   said conductor member having a flat portion exposed for engagement with said member to be braked, and first and second legs for contacting said first and second terminals; and
   said plug and said conductor member frictionally cooperate with said terminals and said retainer means to secure said plug with respect to said friction member and establish a predetermined relationship between said flat portion and said lining of said friction member.

12. A probe carried in the friction lining of a brake shoe for engagement with a member to be braked upon a predetermined amount of lining wear to actuate a warning device, said probe comprising:

a wire;

a terminal secured to said wire;

retainer means in which said terminal is carried;

a generally J-shaped conductor member being embodied in a nonconductive plug;

said plug installed in an opening in said friction member and having a flange for abutment against said friction member;

said conductor member having a flat portion exposed for engagement with said member to be braked, and a leg for contacting said terminal; and said plug and said conductor member frictionally cooperating with said terminal and said retainer means to secure said plug with respect to said friction member and establish a predetermined relationship between said flat portion and said lining of said friction member.

13. In a brake:

a member to be braked;

a friction member having a lining for engagement with the member to be braked;

probe means carried by said friction member;

said probe means including an electrically conductive element for frictional engagement with said member to be braked after a predetermined amount of lining wear;

said member to be braked severing said element after frictional engagement between the latter and the member to be braked;

indicator means; and control means operably connecting said element with the indicator means for actuating the latter upon severing of the element.

14. In a brake:

a member to be braked;

a friction member having a lining for engagement with the member to be braked;

probe means carried by said friction member;

said probe means including an electrically conductive element for frictional engagement with said member to be braked after a predetermined amount of lining wear;

said member to be braked severing said element after frictional engagement between the latter and the member to be braked;

indicator means; and control means operably connecting said element with the indicator means for actuating the latter during a brake actuation only after the lining has worn said predetermined amount to permit the element to engage the member to braked, said control means maintaining actuation of said indicator means after said element is severed.